United States Patent
Kimrey, Jr.

(10) Patent No.: US 11,129,243 B2
(45) Date of Patent: *Sep. 21, 2021

(54) MULTI-PASS MICROWAVE HEATING SYSTEM

(71) Applicant: 915 Labs, Inc., Denver, CO (US)

(72) Inventor: Harold Dail Kimrey, Jr., Knoxville, TN (US)

(73) Assignee: 915 Labs, Inc., Denver, CO (US)

( * ) Notice: Subject to any disclaimer, the term of this patent is extended or adjusted under 35 U.S.C. 154(b) by 398 days.

This patent is subject to a terminal disclaimer.

(21) Appl. No.: 15/921,921

(22) Filed: Mar. 15, 2018

(65) Prior Publication Data

US 2018/0270916 A1    Sep. 20, 2018

Related U.S. Application Data

(60) Provisional application No. 62/471,664, filed on Mar. 15, 2017.

(51) Int. Cl.
*H05B 6/64*    (2006.01)
*H05B 6/70*    (2006.01)
(Continued)

(52) U.S. Cl.
CPC ......... *H05B 6/6411* (2013.01); *H05B 6/6447* (2013.01); *H05B 6/707* (2013.01);
(Continued)

(58) Field of Classification Search
CPC .... H05B 6/6411; H05B 6/6447; H05B 6/707; H05B 6/782; H05B 6/784; H05B 6/802; H05B 2206/044; H05B 2206/045
(Continued)

(56) References Cited

U.S. PATENT DOCUMENTS 2,485,659 A   10/1949   Robertson
2,500,752 A   3/1950    Hanson et al.
(Continued)

FOREIGN PATENT DOCUMENTS

CA   2961408       3/2016
CN   1729047 A     2/2006
(Continued)

OTHER PUBLICATIONS

Craig B. Koskiniemi et al., Improvement of heating uniformity in packaged acidified vegetables pasteurized with a 915 MHz continuous microwave system, Journal of Food Engineering (105), Feb. 10, 2011, pp. 149-160, www.elsevier.com/locate/jfoodeng, Department of Food, Bioprocessing and Nutrition Sciences, North Carolina State University, Raleigh, NC, USA.

(Continued)

*Primary Examiner* — Phuong T Nguyen
*Assistant Examiner* — Yeong Juen Thong
(74) *Attorney, Agent, or Firm* — Polsinelli PC (57) ABSTRACT

Processes and systems for pasteurizing and sterilizing a plurality of articles in a microwave heating system are provided. In certain aspects, groups of articles may be passed by a microwave launcher in a first convey direction and a second, opposite convey direction, so that each group of articles passes the microwave launcher more than once. Processes and systems described herein are also configured to uniformly heat spaced apart groups of articles without disrupting the operation of the microwave generator or distribution system.

6 Claims, 6 Drawing Sheets

(51) Int. Cl.
*H05B 6/80* (2006.01)
*H05B 6/78* (2006.01)

(52) U.S. Cl.
CPC ............ *H05B 6/782* (2013.01); *H05B 6/784* (2013.01); *H05B 6/802* (2013.01); *H05B 2206/044* (2013.01); *H05B 2206/045* (2013.01)

(58) Field of Classification Search
USPC ........ 219/690, 697, 698, 700, 701, 702, 756
See application file for complete search history.

(56) References Cited

U.S. PATENT DOCUMENTS

| | | |
|---|---|---|
| 2,743,440 A | 4/1956 | Riblet |
| 2,769,145 A | 10/1956 | Zaleski et al. |
| 2,946,056 A | 7/1960 | Shanks |
| 3,092,503 A | 6/1963 | Gray |
| 3,261,140 A | 7/1966 | Long et al. |
| 3,365,562 A | 1/1968 | Jeppson |
| 3,398,251 A | 8/1968 | Jeppson et al. |
| 3,402,277 A | 9/1968 | Muller |
| 3,437,495 A | 4/1969 | Jeppson |
| 3,495,062 A | 2/1970 | Puschner |
| 3,521,186 A | 7/1970 | Sharpe |
| 3,544,923 A | 12/1970 | Williams |
| 3,564,458 A | 2/1971 | Cumming |
| 3,597,240 A | 8/1971 | Foltz |
| 3,610,573 A | 10/1971 | Robertson |
| 3,699,899 A * | 10/1972 | Schiffmann ............ A21C 13/02 99/333 |
| 3,718,082 A | 2/1973 | Lipoma |
| 3,753,651 A | 8/1973 | Boucher |
| 3,814,899 A | 6/1974 | Stenstrom |
| 3,820,549 A | 6/1974 | Flinchbaugh |
| 3,945,170 A | 3/1976 | Brown |
| 3,961,569 A | 6/1976 | Kenyon et al. |
| 4,052,036 A | 10/1977 | Schertler |
| 4,071,833 A | 1/1978 | Gould |
| 4,168,418 A | 9/1979 | Bird |
| RE30,310 E | 6/1980 | Stenstrom |
| 4,282,887 A | 8/1981 | Sterzer |
| 4,301,347 A | 11/1981 | Quine |
| 4,332,091 A | 6/1982 | Bensussan et al. |
| 4,336,434 A | 6/1982 | Miller |
| 4,393,088 A | 7/1983 | Matsusaka |
| 4,395,685 A | 7/1983 | Davies et al. |
| 4,446,349 A | 5/1984 | Smith |
| 4,464,554 A | 8/1984 | Bakanowski et al. |
| 4,518,618 A | 5/1985 | Hsia et al. |
| 4,573,660 A | 3/1986 | Husted |
| 4,608,261 A | 8/1986 | MacKenzie |
| 4,613,836 A | 9/1986 | Evans |
| 4,622,448 A | 11/1986 | Awata et al. |
| 4,624,854 A | 11/1986 | Naumann et al. |
| 4,687,895 A | 8/1987 | Chitre et al. |
| 4,779,649 A | 10/1988 | Balter |
| 4,808,782 A | 2/1989 | Nakagawa et al. |
| 4,808,783 A | 2/1989 | Stenstrom |
| 4,839,142 A | 6/1989 | Charm |
| 4,839,485 A | 6/1989 | Koch et al. |
| 4,866,233 A | 9/1989 | Fritz |
| 4,870,236 A | 9/1989 | Berggren |
| 4,874,917 A | 10/1989 | Weimer |
| 4,880,648 A | 11/1989 | Stamer |
| 4,922,215 A | 5/1990 | Bergero et al. |
| 4,999,471 A | 3/1991 | Guarneri et al. |
| 5,049,816 A | 9/1991 | Moslehi |
| 5,066,503 A | 11/1991 | Ruozi |
| 5,074,200 A | 12/1991 | Ruozi |
| 5,080,164 A | 1/1992 | Hermans |
| 5,098,665 A | 3/1992 | Katschnig et al. |
| 5,101,084 A | 3/1992 | Atwell et al. |
| 5,108,701 A | 4/1992 | Zakaria et al. |
| 5,160,819 A | 11/1992 | Ball et al. |
| 5,185,506 A | 2/1993 | Walters |
| 5,228,947 A | 7/1993 | Churland |
| 5,326,530 A | 7/1994 | Bridges |
| 5,379,983 A | 1/1995 | Geiser |
| 5,396,919 A | 3/1995 | Wilson |
| 5,410,283 A | 7/1995 | Gooray et al. |
| 5,436,432 A | 7/1995 | Cyr |
| 5,546,849 A | 8/1996 | Shefet |
| 5,619,908 A | 4/1997 | Catelli et al. |
| 5,750,966 A | 5/1998 | Ruozi |
| 5,903,241 A | 5/1999 | Bhattacharyya |
| 5,910,268 A | 6/1999 | Keefer |
| 6,034,361 A | 3/2000 | Hudak |
| 6,074,202 A | 6/2000 | Yagi et al. |
| 6,080,270 A * | 6/2000 | Tabrez ............... H01J 37/32357 156/345.36 |
| 6,153,868 A | 11/2000 | Marzat |
| 6,403,939 B1 | 6/2002 | Fagrell |
| 6,612,546 B2 | 9/2003 | Young et al. |
| 6,707,347 B2 | 3/2004 | Huang et al. |
| 6,784,405 B2 | 8/2004 | Flugstad et al. |
| 6,831,259 B2 | 12/2004 | Muegge |
| 6,844,534 B2 | 1/2005 | Haamer |
| 6,863,773 B1 | 3/2005 | Emmerich et al. |
| 7,110,313 B2 | 9/2006 | Huang |
| 7,119,313 B2 | 10/2006 | Tang et al. |
| 7,154,103 B2 | 12/2006 | Koenck et al. |
| 7,208,710 B2 | 4/2007 | Gregoire et al. |
| 7,230,218 B2 | 6/2007 | Roussy |
| 7,518,092 B2 | 4/2009 | Purta et al. |
| 7,863,997 B1 | 1/2011 | Alton et al. |
| 7,975,983 B2 | 7/2011 | Comeaux et al. |
| 7,993,603 B2 | 8/2011 | Amedeo et al. |
| 7,996,306 B2 | 8/2011 | Gonen et al. |
| 8,087,407 B2 | 1/2012 | Wiker et al. |
| 8,426,784 B2 | 4/2013 | Drozd |
| 8,657,256 B2 | 2/2014 | Geiser |
| 9,049,751 B1 | 6/2015 | Erle |
| 9,380,650 B2 * | 6/2016 | Kimrey, Jr. ....... H01L 21/67201 |
| 9,642,385 B2 | 5/2017 | Tang et al. |
| 9,955,711 B2 | 5/2018 | Newman |
| 2003/0034345 A1 | 2/2003 | Conway et al. |
| 2004/0027303 A1 | 2/2004 | Drozd |
| 2005/0123435 A1 | 6/2005 | Cutler et al. |
| 2005/0199618 A1 | 9/2005 | Cook et al. |
| 2006/0231550 A1 | 6/2006 | Wendel et al. |
| 2006/0151533 A1 | 7/2006 | Simunovic et al. |
| 2007/0215611 A1 | 9/2007 | O'Hagan et al. |
| 2007/0235448 A1 | 10/2007 | Lihl et al. |
| 2008/0264934 A1 | 10/2008 | Moreira et al. |
| 2008/0299276 A1 | 12/2008 | Eubanks et al. |
| 2009/0092708 A1 | 4/2009 | Alvarado et al. |
| 2009/0208614 A1 | 8/2009 | Sharma et al. |
| 2009/0236334 A1 | 9/2009 | Ben-Shmuel et al. |
| 2009/0283517 A1 | 11/2009 | Mackay et al. |
| 2009/0321428 A1 | 12/2009 | Hyde et al. |
| 2010/0059510 A1 | 3/2010 | Ristola et al. |
| 2010/0060391 A1 | 3/2010 | Ristola et al. |
| 2010/0072194 A1 | 3/2010 | Mackay et al. |
| 2010/0126988 A1 | 5/2010 | Mackay et al. |
| 2010/0282741 A1 | 11/2010 | Van Daele et al. |
| 2011/0233442 A1 | 9/2011 | Nygaard et al. |
| 2011/0266717 A1 | 11/2011 | Nehls et al. |
| 2011/0287151 A1 | 11/2011 | Simunovic et al. |
| 2011/0303102 A1 | 12/2011 | Amedeo et al. |
| 2012/0063752 A1 | 3/2012 | Cochran |
| 2012/0092091 A1 | 4/2012 | Kang |
| 2012/0279448 A1 | 11/2012 | Muegge et al. |
| 2013/0149075 A1 | 6/2013 | Shah et al. |
| 2013/0240516 A1 | 9/2013 | Kimrey, Jr. |
| 2013/0240517 A1 | 9/2013 | Kimrey, Jr. et al. |
| 2013/0243560 A1 | 9/2013 | Kimrey, Jr. et al. |
| 2014/0083820 A1 | 3/2014 | Mackay |
| 2016/0183333 A1 | 6/2016 | Mohammed et al. |
| 2016/0309549 A1 | 10/2016 | Kimrey, Jr. et al. |
| 2017/0027196 A1 | 2/2017 | Resurreccion et al. |
| 2017/0043936 A1 | 2/2017 | Resurreccion, Jr. |
| 2017/0099704 A1 | 4/2017 | Kimrey, Jr. et al. |
| 2017/0142785 A1 | 5/2017 | Chang et al. |
| 2017/0245528 A1 | 8/2017 | Hirschey et al. |

(56) References Cited

U.S. PATENT DOCUMENTS

| | | |
|---|---|---|
| 2018/0014559 A1 | 1/2018 | Tang et al. |
| 2018/0057244 A1 | 3/2018 | Boek |
| 2018/0111359 A1 | 4/2018 | Komro et al. |

FOREIGN PATENT DOCUMENTS

| | | |
|---|---|---|
| CN | 1849846 | 10/2006 |
| CN | 101970197 | 2/2011 |
| CN | 106465491 | 2/2017 |
| CN | 106472947 A | 3/2017 |
| CN | 206077729 U | 4/2017 |
| CN | 206077730 U | 4/2017 |
| CN | 106658803 | 5/2017 |
| CN | 106793812 | 5/2017 |
| CN | 206403121 U | 8/2017 |
| CN | 107252030 | 10/2017 |
| CN | 206576184 U | 10/2017 |
| CN | 107535796 A | 1/2018 |
| CN | 206994307 | 2/2018 |
| CN | 207305995 U | 5/2018 |
| EP | 2335483 | 6/2011 |
| EP | 3169141 A1 | 5/2017 |
| EP | 3277496 A1 | 2/2018 |
| EP | 2366268 B1 | 5/2018 |
| FR | 1473832 | 9/1964 |
| FR | 2645391 | 4/1989 |
| GB | 2067059 | 7/1981 |
| GB | 2541373 A | 2/2017 |
| JP | 2005-295848 A | 10/2005 |
| JP | 2008-253202 A | 10/2008 |
| JP | 2010-139217 A | 6/2010 |
| JP | 2010-166863 A | 8/2010 |
| JP | 2011-21210 A | 2/2011 |
| JP | 3211163 U | 6/2017 |
| JP | 2017521111 | 8/2017 |
| JP | 2017532029 | 11/2017 |
| KR | 10-0242633 B1 | 2/2000 |
| KR | 10-2008-0087821 | 10/2008 |
| KR | 1020170054433 A | 5/2017 |
| KR | 1020180016081 | 2/2018 |
| KR | 101849847 B | 4/2018 |
| WO | 97/26777 | 7/1997 |
| WO | 2004/036991 | 5/2004 |
| WO | 2004/056468 A1 | 7/2004 |
| WO | 2005/023013 | 3/2005 |
| WO | 2006012506 A1 | 2/2006 |
| WO | 2007108674 | 9/2007 |
| WO | 2017055501 A1 | 4/2017 |
| WO | 2018017548 A1 | 1/2018 |
| WO | 2018026168 A1 | 2/2018 |
| WO | 2018039112 A1 | 3/2018 |
| WO | 2018063468 A1 | 4/2018 |
| WO | 2018063469 A1 | 4/2018 |
| WO | 2018097355 A1 | 5/2018 |

OTHER PUBLICATIONS

P. Kumar et al., Measurement of Dielectric Properties of Pumpable Food Materials under Static and Continuous Flow Conditions, JFS E: Food Engineering and Physical Properties, Journal of Food Science, vol. 72, Nr. 4, 2007, Institute of Food Technologists, pp. E177-E183.

Y. Wang et al., Sterilization of Foodstuffs Using Radio Frequency Heating, JFS E: Food Engineering and Physical Properties, Journal of Food Science, vol. 68, Nr. 2, 2003, Institute of Food Technologists, pp. 539-544.

Kunchalee Luechapattanaporn et al., Sterilization of Scrambled Eggs in Military Polymeric Trays by Radio Frequency Energy, JFS E: Food Engineering and Physical Properties, Journal of Food Science, vol. 70, Nr. 4, 2005, Institute of Food Technologists, pp. E288-E294.

Safety of Foods Processed Using Four Alternative Processing Technologies, Supported by USDA National Integrated Food Safety Initiative Project No. 2003-51110-02093, http://www.oardc.ohio-state.edu/sastry/USDA_project.htm, 4 pages.

FDA Proposes to Allow the Use of Alternative Temperature-Indicating Devices for Processing Low-Acid Canned Foods, FDS News Release, http://www.fda.gov/NewsEvents/Newsroom/PressAnnouncements/2007/ucm108867.htm, Mar. 13, 2007, 2 pages.

CFR—Code of Federal Regulations Title 21, http://www.accessdata.fda.gov/scripts/cdrh/cfdocs/cfCFR/CFRSearch.cfm?CFRPart=113, 2 pages.

CFR—Code of Federal Regulations Title 21, http://www.accessdata.fda.gov/scripts/cdrh/cfdocs/cfCFR/CFRSearch.cfm?CFRPart=11&showFR=1, 6 pages.

Microwave sterilisation of foods: an industry—changing development, http://www.labint-online.com/featured-articles/microwave-sterilisation-of-foods-an-industry-changing-development/index.html, Pan Global, 2 pages.

Gustosi Italian Ready Meals, Screen shots of video found at http://www.gusto-si.it/engnew/technologia.html, Gustosi S.p.A., Frazione Baitoni, 10 pages.

Juming Tang, PH.D., Microwave (and RF) Heating in Food Processing Applications, Department of Biological Systems Engineering, Washington State University, Pullman, WA, 62 pages, Power Point Presentation.

Search Report and Written Opinion dated Jun. 11, 2018 for related PCT Application No. PCT/US2018/022567, 14 pages.

\* cited by examiner

MULTI-PASS MICROWAVE HEATING SYSTEM

CROSS-REFERENCE TO RELATED APPLICATIONS

This application claims priority to U.S. Provisional Patent Application No. 62/471,664, filed on Mar. 15, 2017, the entire disclosure of which is incorporated by reference herein.

FIELD OF THE INVENTION

The present invention relates to methods and systems for heating a plurality of articles in a microwave heating system. In particular, embodiments of the present invention may be used for microwave-assisted pasteurization or sterilization of packaged foodstuffs and other similar items.

BACKGROUND

Microwave radiation is a known mechanism for delivering energy to an object. The ability of microwave energy to penetrate and heat an object in a rapid and effective manner has proven advantageous in many chemical and industrial processes. Because of its ability to quickly and thoroughly heat an article, microwave energy has been employed in heating processes wherein the rapid achievement of a pre-scribed minimum temperature is desired, such as, for example, pasteurization or sterilization processes. Further, because microwave energy is generally non-invasive, microwave heating may be particularly useful for heating dielectrically sensitive materials, such as food and pharmaceuticals. However, to date, the complexities and nuances of safely and effectively applying microwave energy, especially on a commercial scale, have severely limited its application in several types of industrial processes.

A need exists for a microwave heating system suitable for the sterilization or pasteurization of a wide variety of packaged foodstuffs and other items. The system would be capable of providing consistent, uniform, and rapid heating of the articles with a high degree of operational flexibility. Processes performed by such a system would minimize, or even prevent, hot and cold spots in the articles, and ensure the pasteurized and sterilized articles achieve target standards for microbial lethality and overall quality.

SUMMARY

One embodiment of the present invention concerns a process for heating a plurality of articles in a microwave heating system, said process comprising: (a) introducing a first group of articles into a first zone of a microwave heating chamber; (b) transporting said first group of articles along a convey line from said first zone to a second zone, wherein said transporting of step (b) includes moving said first group of articles past a first microwave launcher in a first convey direction; (c) transporting said first group of articles along said convey line from said second zone back to said first zone, wherein said transporting of step (c) includes moving said first group of articles past said first microwave launcher in a second convey direction opposite said first convey direction; (d) transporting said first group of articles along said convey line from said first zone back to said second zone, wherein said transporting of step (d) includes moving said first group of articles past said first microwave launcher in said first convey direction; and (e) during at least a portion of said transporting of steps (b) through (d), directing microwave energy from said first microwave launcher toward said first group of articles.

Another embodiment of the present invention concerns a microwave heating system for heating articles, said microwave heating system comprising a microwave heating chamber for heating said articles, at least one convey line for transporting said articles through said microwave heating chamber, a microwave generator for generating microwave energy, a first microwave launcher for directing at least a portion of said microwave energy to said microwave heating chamber, wherein said first microwave launcher defines a first launch opening configured to discharge microwave energy toward said articles on said convey line, and a convey line control system configured to move said articles in a first convey direction and a second convey direction opposite said first convey direction so that each of said articles is moved past said first launch opening more than once.

Yet another embodiment of the present invention concerns a process for heating articles in a microwave heating system, said process comprising: (a) generating microwave energy with at least one microwave generator; (b) passing at least a portion of said microwave energy from said microwave generator to a microwave heating chamber via a microwave distribution system comprising one or more waveguides and a first microwave launcher; (c) passing a first group of articles and a second group of articles through said microwave heating chamber along a convey line in a first convey direction; (d) discharging microwave energy into said microwave heating chamber via a first launch opening of said first microwave launcher; (e) heating said first and second groups of articles using at least a portion of said microwave energy discharged from said first microwave launcher. The first and second groups of articles are spaced apart from one another in said convey direction by a distance that is at least 50 percent of the maximum dimension of said first launch opening measured in a direction parallel to said convey line.

Still another embodiment of the present invention concerns a microwave heating system for heating a plurality of articles, said system comprising a microwave heating chamber for receiving and heating said articles, a convey line for transporting said articles through said microwave heating chamber along a convey axis, at least one microwave generator for generating microwave energy, and a microwave distribution system for directing said microwave energy from said microwave generator to said microwave heating chamber. The microwave distribution system comprises at least a first microwave splitter, first and second pairs of opposed microwave launchers, first and second waveguide branches, and first and second circulator/load pairs. The first microwave splitter is configured to divide at least a portion of said microwave energy into at least a first microwave energy fraction and a second microwave energy fraction. The first and second pairs of opposed microwave launchers are configured to direct at least a portion of respective first and second microwave energy fractions into said microwave heating chamber. The first and second waveguide branches are configured to pass said first and second microwave energy fractions from said microwave splitter to respective first and second pairs of opposed microwave launchers. The first and second circulator/load pairs are positioned downstream of said microwave splitter for receiving at least a portion of said microwave energy reflected back into said microwave distribution system from said microwave heating chamber.

BRIEF DESCRIPTION OF THE DRAWINGS

Various embodiments of the present invention are described in detail below with reference to the attached drawing Figures, wherein.

DETAILED DESCRIPTION

The present invention relates to methods and systems for heating a plurality of articles in a microwave heating system. The processes and systems as described herein provide a greater degree of operational flexibility and enhanced efficiency, while permitting rapid and uniform heating of the articles being processed. The present invention be particularly useful for microwave-assisted pasteurization or sterilization of packaged foodstuffs and other similar items.

In general, pasteurization involves the rapid heating of an item to a minimum temperature between 80° C. and 100° C., while sterilization involves heating the item to a minimum temperature between about 100° C. and about 140° C. In some cases, pasteurization and sterilization may take place simultaneously, or nearly simultaneously, and, as a result, the processes and systems described herein may be configured for both pasteurization and sterilization. Alternatively, the processes and systems may be configured only for pasteurization. Examples of suitable types of items to be pasteurized or sterilized include, but are not limited to, packaged foodstuffs, beverages, medical instruments and fluids, dental instruments and fluids, veterinary fluids, and/or pharmaceutical fluids.

Embodiments of the present invention may be carried out in a variety of different types of microwave heating systems including, for example, those similar to the microwave heating systems described in U.S. Patent Application Publication No. US 2013/0240516, which is incorporated herein by reference in its entirety. In other embodiments, methods as described herein may also be carried out in a microwave heating system similar to the systems described in U.S. Pat. No. 7,119,313.

Figure 1A:
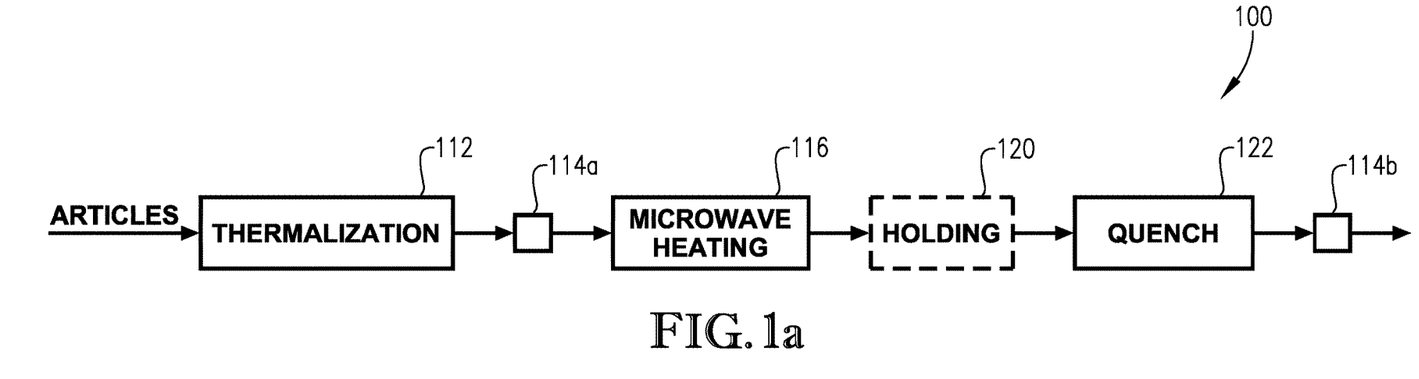
FIG. 1a is a schematic depiction of the major steps of a method for microwave pasteurizing or sterilizing a packaged foodstuff according to embodiments of the present invention.
Figure 1B:
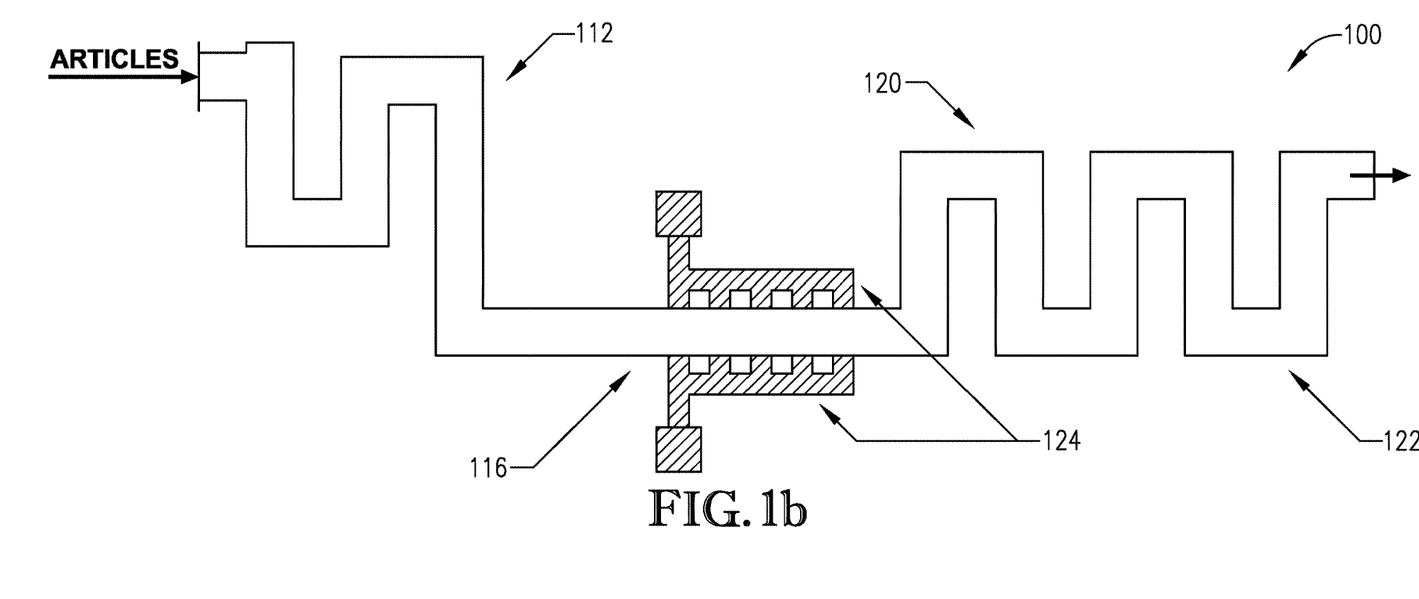
FIG. 1b is a schematic depiction of the major zones of a system for microwave pasteurizing or sterilizing a packaged foodstuff according to embodiments of the present invention.

Turning now to FIGS. 1a and 1b, schematic diagrams of the main steps of a microwave heating process and the main elements of a microwave heating system suitable for pasteurizing or sterilizing articles according to embodiments of the present invention are provided. As used herein, the term "microwave energy" generally refers to electromagnetic energy having a frequency between 300 MHz and 30 GHz.

As shown in FIGS. 1a and 1b, articles introduced into the microwave heating system 100 are first passed through a thermalization zone 112, wherein the articles are heated to achieve a substantially uniform temperature. Once thermalized, the articles may optionally be passed through a pressure adjustment zone, shown as 114a in FIG. 1a, before being introduced into the microwave heating zone 116. In the microwave heating zone 116, the articles may be rapidly heated using microwave energy discharged into the heating zone 116 by one or more microwave launchers, as generally shown as launchers 124 in FIG. 1b. The heated articles can then optionally be passed through a holding zone 120, wherein the articles may be permitted to thermally equilibrate so that the coldest portion of each article is maintained at a temperature at or above a predetermined target temperature (e.g., a pasteurization or sterilization target temperature) for a specified amount of time. Subsequently, the articles may then be passed through a quench zone 122, wherein the articles can be cooled to a suitable handling temperature. Optionally, the articles may be passed through a second pressure adjustment zone 114b before being removed from the system.

In some cases, the thermalization, microwave heating, holding, and/or quench zones of the microwave system depicted in FIGS. 1a and 1b can be defined within a single vessel, while, in other cases, one or more of these zones may be defined within one or more separate vessels. Additionally, in some cases, one or more of these steps can be carried out in a vessel that is at least partially filled with a liquid medium in which the articles being processed can be at least partially submerged during processing. As used herein, the term "at least partially filled" denotes a configuration where at least 50 percent of the volume of the specified vessel is filled with a liquid medium. In certain embodiments, the volume of at least one of the vessels used in the thermalization zone, the microwave heating zone, the holding zone, and the quench zone can be at least about 75 percent, at least about 90 percent, at least about 95 percent, or 100 percent filled with a liquid medium.

When used, the liquid medium used may include any suitable type of liquid. In some cases, the liquid medium may have a dielectric constant greater than the dielectric constant of air and, in addition or the alternative, can have a dielectric constant similar to the dielectric constant of the articles being processed. Water (or a liquid medium comprising water) may be particularly suitable for systems used to heat consumable articles. The liquid medium may also include one or more additives, such as, for example, oils, alcohols, glycols, and salts in order to alter or enhance its physical properties (e.g., boiling point) of the liquid medium at the conditions of operation of the system.

Additionally, the microwave heating system 100 may include at least one conveyance system (not shown in FIGS. 1a and 1b) for transporting the articles through one or more of the processing zones described above. Examples of suitable conveyance systems can include, but are not limited to, plastic or rubber belt conveyors, chain conveyors, roller conveyors, flexible or multi-flexing conveyors, wire mesh conveyors, bucket conveyors, pneumatic conveyors, screw conveyors, trough or vibrating conveyors, and combinations thereof. Any suitable number of individual convey lines can be used with the conveyance system, and the convey line or lines may be arranged in any suitable manner within the vessels.

In operation, the articles introduced into the microwave system 100 depicted in FIGS. 1a and 1b enter the thermalization zone 112 and are heated and/or thermally equilibrated to achieve a substantially uniform temperature. For example, at least about 85 percent, at least about 90 percent, at least about 95 percent, at least about 97 percent, or at least about 99 percent of all the articles withdrawn from the thermalization zone have a temperature within about 5° C., within about 2° C., or within 1° C. of one another. As used herein, the terms "thermalize" and "thermalization" generally refer to a step of temperature equilibration or equalization.

When the thermalization zone 112 is at least partially filled with a liquid medium, the articles can be at least partially submerged in the liquid during the passing. The liquid medium in the thermalization zone 112 can be warmer or cooler than the temperature of the articles passing therethrough and, in some cases, can have an average bulk temperature of at least about 30° C., at least about 35° C., at least about 40° C., at least about 45° C., at least about 50° C., at least about 55° C., or at least about 60° C. and/or not more than about 100° C., not more than about 95° C., not more than about 90° C., not more than about 85° C., not more than about 80° C., not more than about 75° C., not more than about 70° C., not more than about 65° C., or not more than about 60° C.

The thermalization step can be carried out under ambient pressure or it may be carried out in a pressurized vessel. When pressurized, thermalization may be performed at a pressure of at least about 1, at least about 2, at least about 5, or at least about 10 psig and/or not more than about 80, not more than about 50, not more than about 40, or not more than about 25 psig. When the thermalization zone 112 is liquid filled and pressurized, the pressure may be in addition to any head pressure exerted by the liquid. Articles undergoing thermalization can have an average residence time in the thermalization zone 112 of at least about 1 minute, at least about 5 minutes, at least about 10 minutes and/or not more than about 60 minutes, not more than about 20 minutes, or not more than about 10 minutes. The articles withdrawn from the thermalization zone 112 can have an average temperature of at least about 20° C., at least about 25° C., at least about 30° C., at least about 35° C. and/or not more than about 90° C., not more than about 75° C., not more than about 60° C., or not more than about 50° C.

When the thermalization zone 112 and microwave heating zone 116 operate at substantially different pressures, the articles exiting the thermalization zone 112 may be passed through a pressure adjustment zone 114a before entering the microwave heating zone 116. When used, the pressure adjustment zone may be any zone or system configured to transition the articles between an area of lower pressure and an area of higher pressure. The difference between the low and high pressure zones may vary depending on the system and can, for example, be at least about 1 psig, at least about 5 psig, at least about 10 psig, at least about 12 psig and/or not more than about 75 psig, not more than about 50 psig, not more than about 40 psig, or not more than about 35 psig. When the quench zone 122 shown in FIGS. 1a and 1b is operated at a different pressure than the microwave heating zone 116, another pressure adjustment zone may be present to transition the articles between the microwave heating zone 116 or hold zone 120 and quench zone 122. In some cases, the first pressure adjustment zone 114a can transition the articles from a lower pressure thermalization zone 112 to a higher pressure microwave heating zone 116, while the second pressure adjustment zone 114b may transition the carrier from a higher pressure holding zone 120 (or a higher-pressure portion of the quench zone) to a lower pressure quench zone 122, or portion thereof.

After thermalization, the articles may be introduced into the microwave heating zone 116 and heated using a portion of the microwave energy discharged into a microwave heating chamber via one or more microwave launchers, shown as 124 in FIG. 1b. Various configurations of microwave heating systems of the present invention may employ microwave energy having varying frequencies, with a frequency of about 915 MHz being preferred. In some cases, the microwave energy discharged into the microwave heating chamber may be polarized. In addition to microwave energy, the microwave heating zone 116 may optionally utilize one or more other types of heat sources such as, for example, various conductive or convective heating methods of devices. However, it is generally preferred that at least about 50, at least about 55, at least about 60, at least about 65, at least about 70, at least about 75, at least about 80, at least about 85, at least about 90, or at least about 95 percent of the energy used to heat the articles in the microwave heating zone be microwave energy.

Figure 2:
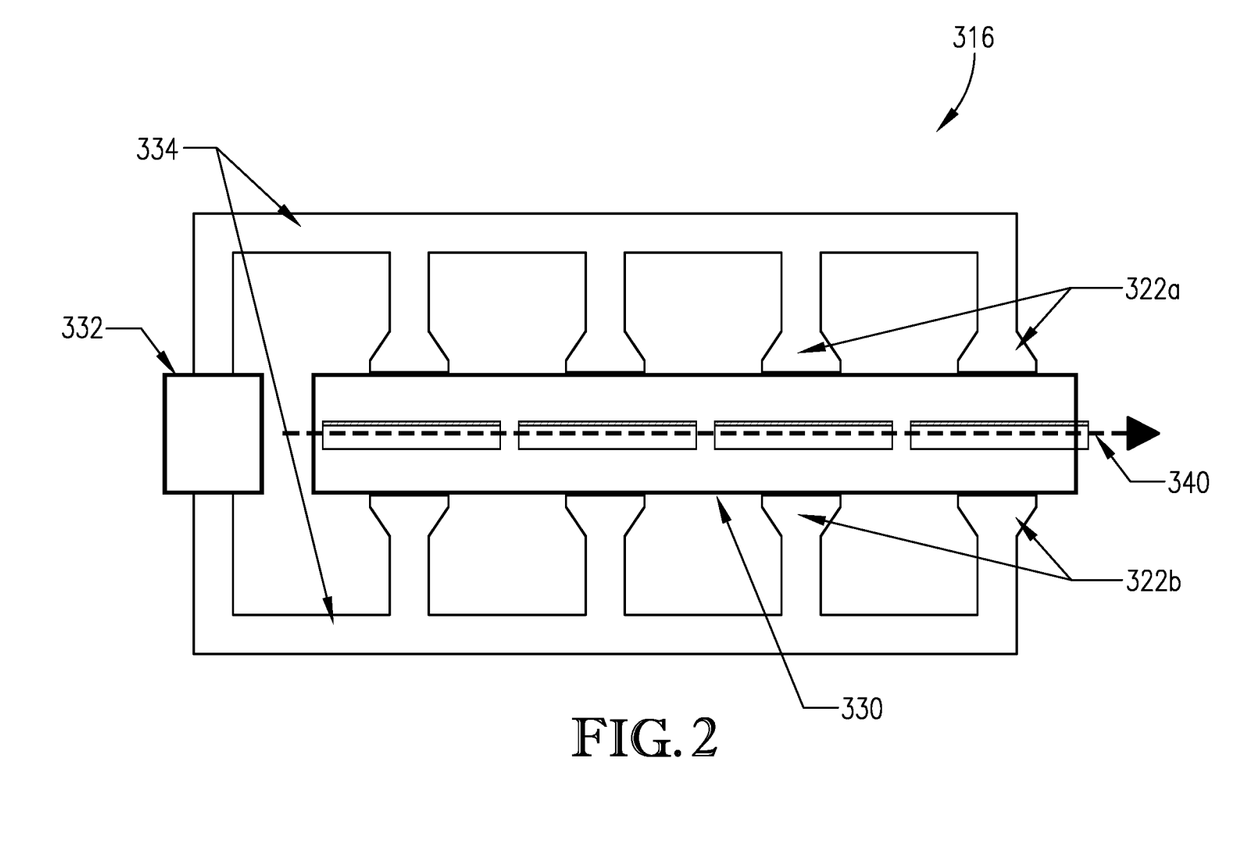
FIG. 2 is a schematic partial side cut-away view of a microwave heating zone configured according to embodiments of the present invention, particularly illustrating one possible arrangement of the microwave heating vessel, the microwave launchers, and the microwave distribution system.

One example of a microwave heating zone 316 configured for use in the microwave heating system described herein is shown schematically in FIG. 2. The microwave heating zone 316 shown in FIG. 2 generally includes a microwave heating chamber 330, at least one microwave generator 332 for generating microwave energy, and a microwave distribution system 334 for directing at least a portion of the microwave energy from the generator or generators 332 to the microwave heating chamber 330. The system further comprises one or more microwave launchers 322a and 322b for discharging microwave energy into the interior of the microwave heating chamber 330, and a convey line 340 for passing articles through the microwave heating chamber 330.

Figure 3:
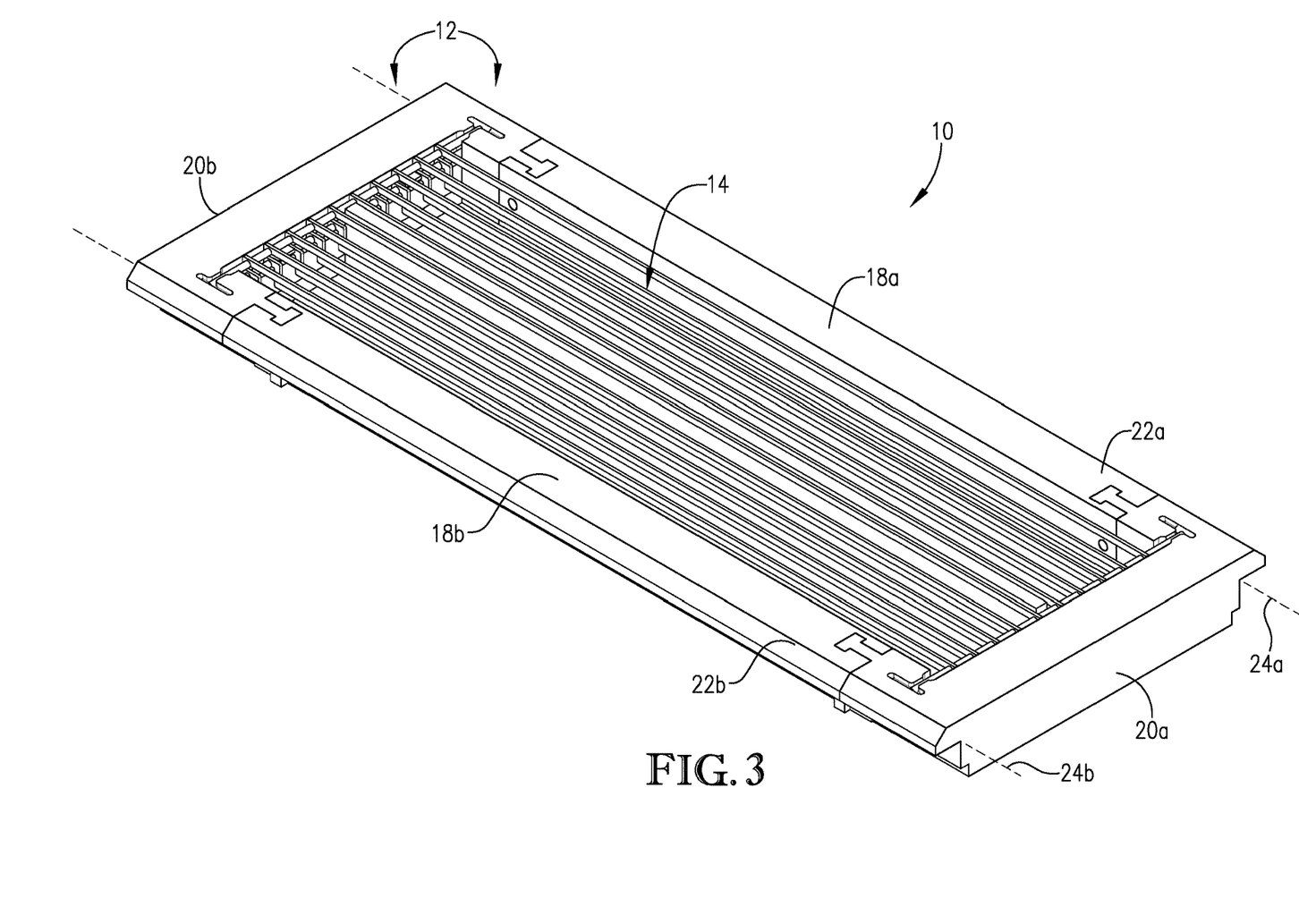
FIG. 3 is a top isometric view of a carrier suitable for use in one or more embodiments of the present invention.

In some cases, the articles may be transported along the convey line in groups of two or more individual articles, while, in other cases, groups of articles may be loaded into one or more carriers 310, as generally depicted in FIG. 2. A description of carriers that may be used with the present invention is provided in U.S. patent application Ser. No. 15/284,173, which is incorporated herein by reference in its entirety. One example of a carrier suitable for use in the present invention is shown in FIG. 3. As shown in FIG. 3, the carrier 10 includes an outer frame 12, an upper support structure 14, and a lower support structure 16. The outer frame 12 comprises two spaced-apart side members 18a,b and two spaced-apart end members 20a,b. The first and second end members 20a,b may be coupled to and extend between opposite ends of first and second side members 18a,b to form outer frame 12. When each of side members 18a,b are longer than the end members 20a,b, the frame may have a generally rectangular shape, as shown FIG. 3.

As also shown in FIG. 3, first and second side members 18a,b each include respective support projections 22a,b that are configured to engage respective first and second convey line support members, which are represented by dashed lines 24a and 24b in FIG. 3. The first and second support projections 22a,b of carrier 10 present first and second lower support surfaces (not shown) for supporting carrier 10 on first and second convey line support members 24a,b. Convey line support members 24a,b may be a moving convey line element such as, for example, a pair of chains (not shown) located on each side of carrier 10 as it moves through the microwave heating zone.

In some embodiments, the present invention relates to an improved method for heating a group of articles passing through a microwave heating chamber. According to this method, individual articles are transported in groups of two or more along a convey line through the microwave heating chamber. The convey line is configured to move the groups of articles in two opposite convey directions (e.g., forward and reverse) so that each of the articles is moved past a single microwave launcher more than once. As a result, the articles are exposed to microwave energy from the same launcher at least three times—once during the initial forward pass, once during the reverse pass, and once again on the second forward pass. This movement can be repeated any number of times with a single launcher, and may be repeated again with one or more other microwave launchers within the system. This method of heating the articles increases the total energy discharged toward each article without requiring the use of larger heating chambers and more launchers. Additionally, this method provides a greater degree of operational flexibility by permitting various articles to be heated with different amounts of microwave energy by adjusting the total number of passes. Embodiments of this heating method is described in further detail below, with respect to FIG. 4.

Figure 4:
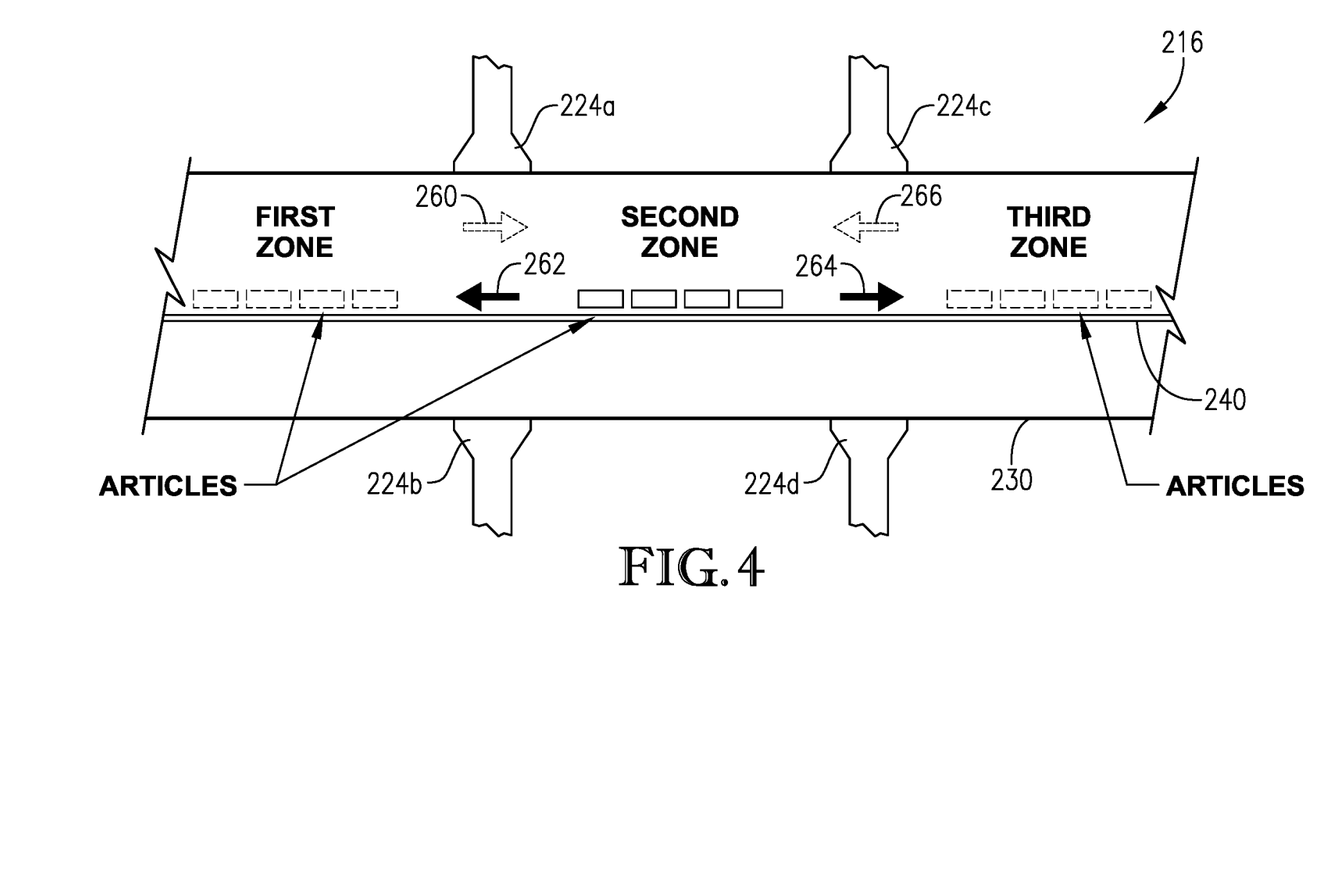
FIG. 4 is a schematic partial side cut-away view of a microwave heating chamber configured according to embodiments of the present invention, particularly illustrating possible movements of groups of articles within the microwave heating chamber.

Turning now to FIG. 4, one example of a microwave heating zone 216 is provided. In the example shown in FIG. 4, the microwave heating zone 216 includes a microwave heating chamber 230, two pairs of opposed microwave launchers (pair 224a and 224b and pair 224c and 224d), and a convey line 240 for passing groups of articles through the heating chamber. Other configurations of microwave heating zones are possible including, for example, those including more or fewer launchers or launchers oriented in a different manner. For example, one or more of the launchers may be tilted at a launch tilt angle of at least 2° and/or at least one launch opening may be at least partially covered with a microwave-transparent window, as described in detail in the '516 application. Specific examples of suitable launcher configurations, including particular sizes, shapes, and other features, are also described in detail in the '516 application.

Referring again to FIG. 4, a group of articles, shown with dashed lines in FIG. 4, may be introduced into a first zone of the microwave heating chamber 230. The group of articles (or any other group described herein) can include any suitable number of individual articles including, for example, at least 2, at least 5, at least 8, at least 10, at least 12, at least 14, at least 16, at least 18, or at least 20 individual articles and/or not more than 100, not more than 75, not more than 50, not more than 40, not more than 35, or not more than 30 individual articles.

As used herein with respect to the interior of the microwave heating chamber, the term "zone" generally refers to the space not directly under a launch opening. A zone may be prior to the first launcher, between two adjacent launchers, or after the last launcher. In one embodiment shown in FIG. 4, the first zone is located before the first pair of opposed launchers 224a and 224b, the second zone is located between the first pair of opposed launchers 224a and 224b and the second pair of opposed launchers 224c and 224d, and the third zone is located after the second pair of opposed launchers 224c and 224d.

As used herein, the terms "first," "second," "third," and the like are used to describe various elements and such elements should not be limited by these terms. These terms are only used to distinguish one element from another and do not necessarily imply a specific order or even a specific element. For example, an element may be regarded as a "first" element in the description and a "second element" in the claims without departing from the scope of the present invention. Consistency is maintained within the description and each independent claim, but such nomenclature is not necessarily intended to be consistent therebetween.

As shown in FIG. 4, the group of articles introduced into the first zone of the microwave heating chamber 230 may be moved along the convey line 240 in a first convey direction, shown with dashed arrow 260, toward the outlet of the microwave heating chamber (i.e., the "forward" direction). As they are moved by the convey line 240, the articles in the group pass by at least one microwave launcher. In some cases, they may be moved past a pair of opposed microwave launchers, shown as launchers 224a and 224b in FIG. 4. During the passing, microwave energy discharged from the opening of the microwave launcher or launchers is directed toward the articles. When the microwave heating chamber 230 is at least partially filled with a liquid medium, the articles may be at least partially, or totally, submerged in the liquid medium during the passing.

The total amount of time that the articles are moved along the convey line 240 from the first zone to the second zone within the interior of the microwave heating chamber 230 and the total amount of microwave energy discharged from one or both launchers 224a and 224b depend, at least in part, on the speed at which the group of articles is moved along the convey line 240. In some cases, the convey line speed may at least about 0.50, at least about 0.75, at least about 1, at least about 1.5, at least about 2, or at least about 2.5 inches per minute (in/min) and/or not more than about 5, not more than about 4.5, not more than about 4, not more than about 3.5, or not more than about 3 in/min. The convey line 240 may be configured so that the line speed can be adjusted for different runs to alter the time and/or amount of microwave energy to which the articles in each separate run are exposed.

Referring again to FIG. 4, once in the second zone, the group of articles may be subjected to a hold period, during which the articles are no longer be exposed to microwave energy. The articles may be permitted to thermalize during the hold period. Each hold period may have a total duration of at least about 5, at least about 10, at least about 15, at least about 20, at least about 25, at least about 30, at least about 35, at least about 40, at least about 45, or at least about 50 seconds, or 1 minute and/or not more than about 10, not more than about 8, not more than about 5, not more than about 3, not more than about 2 minutes, or not more than about 1 minute. In some cases, the hold period can be started by, for example, turning off the generator or otherwise blocking the transmission of microwave energy from the generator to the first set of microwave launchers. In other cases, the microwave generator may be continuously operated and the hold time may begin when an article moves away from the microwave field emitted by one launcher and may continue as the article moves along the convey line (or stops in the subsequent zone) until the article enters the microwave field emitted by an adjacent microwave launcher. In such cases, the speed of the convey line and the spacing between adjacent microwave launchers may impact the total duration of the hold time.

After the hold period, or "dwell time," the group of articles shown in FIG. 4 may then be passed back from the second zone to the first zone of the microwave heating chamber 230 by transporting the group of articles in a second convey direction opposite of the first convey direction, as shown by arrow 262 in FIG. 4. The second convey direction may be toward the inlet of the microwave heating chamber (i.e., the "reverse" direction). As the articles are moved back to the first zone, they pass by the same microwave launcher (or pair of launchers 224a and 224b) and microwave energy is again discharged from the launch opening (or openings) toward the articles. The convey speed used to move the group of articles back to the first zone from the second zone may be the same as or different than it was during the first pass.

Once back in the first zone, the articles can again be subjected to a hold period during which they are not exposed to microwave energy. During this (or any other) hold period, the articles may be exposed to not more than about 25, not more than about 20, not more than about 15, not more than about 10, or not more than about 5 percent of the maximum amount of microwave energy to which the articles were exposed during passage from the second to the first zone. The hold period can have a total duration in the ranges provided above and the duration may be the same or different than the previous hold period. In some cases, one or both of the first and second hold periods may be omitted so that the group of articles is continually passed back and forth past the microwave launchers 224a and 224b.

After the second hold period, when used, the group of articles may again be transported from the first zone to the second zone in the first convey direction. Similar to the previous moving steps, the articles may again pass by the same microwave launcher or launchers and may again be exposed to microwave energy discharged from the launch opening. The convey speed used to move the articles back into the second zone may be the same as or different than the convey speed used to transport the articles during the previous moving steps. Once in the second zone, the articles may again be subjected to another optional hold period of the same or different duration than one or both previous hold periods.

After the first group of articles has moved into the second zone within the interior of the microwave heating chamber 230, another group of articles may be loaded into the first zone. This second group (not shown) may include articles of similar size, shape, and/or type as the first group, or one or more articles in the second group may be different. The second group of articles may also be loaded in a carrier. When loaded into the first zone, the first and second groups of articles may be spaced apart from one another along the convey line by a distance of at least about 2, at least about 5, at least about 8, at least about 10, or at least about 12 inches, measured between the closest points of the nearest articles in each group, or between adjacent edges of consecutive carriers, whichever is smallest. In some cases, adjacent groups of articles may be spaced apart from one another along the convey line by a minimum distance that is at least about 50, at least about 55, at least about 60, at least about 65, at least about 70, at least about 75, at least about 80, at least about 85, at least about 90, or at least about 95 percent of the maximum dimension of the launch opening of at least one microwave launcher that extends in the direction parallel to the direction along which the articles are conveyed.

The second group of articles can be introduced into the first zone of the microwave heating chamber 230 at any suitable time. In some cases, the movement of the second group of articles into the first zone may be performed simultaneously with the movement of the first group of articles into the second zone of the microwave heating chamber 230. Alternatively, the first group of articles may be moved nearly entirely, or entirely, out of the first zone of the microwave heating chamber 230 before the step of loading the second group of articles into the first zone of the microwave heating chamber 230 is begun.

Next, the first group of articles may be transported from the second zone to the third zone in the forward direction, as generally shown by arrow 264 in FIG. 4. During this movement, the first group of articles passes by at least one other microwave launcher, or, as shown in FIG. 4, a second pair of opposed microwave launchers 224c and 224d. As the articles pass by the launcher or launchers, microwave energy is discharged from the opening (or openings) of the launcher (or launchers) toward the articles. At nearly the same time, or simultaneously, the second group of articles may be transported along the convey line from the first zone to the second zone of the microwave heating chamber 230 in the forward direction and may pass by the first microwave launcher or set of launchers 224a and 224b. During this passing, microwave energy discharged from the launcher (or set of launchers) is directed toward the second group of articles. Upon arrival in the second and third microwave zones, respectively, the second and first groups of articles may be subjected to a hold period, as described previously.

After the hold period, the first and second groups of articles may be returned to respective second and first zones of the microwave heating chamber 230 by transporting both groups of articles along the convey line in the reverse direction, shown by arrows 262 and 266 in FIG. 4. During this step, the second group of articles again passes by the first microwave launcher or set of launchers 224a and 224b, and the first group of articles passes by the second microwave launcher or set of launchers 224c and 224d, as shown in FIG. 4. Both groups of articles are then exposed to additional microwave energy during the passing. After another optional hold period, the second and first groups of articles may be returned to the respective second and third zones of the microwave heating chamber 230 by again moving each group of articles along the convey line 240 in the forward direction, as shown by arrows 260 and 264. These steps may occur simultaneously, or the movement of one of the two groups may be delayed relative to the other. As the articles move into the second and third zones, the second and first groups of articles again pass by respective first and second launchers or pairs of launchers 224a and 224b and launchers 224c and 224d, respectively, which again discharge microwave energy toward the articles in each group.

Once in the third zone and after an optional hold period, the first group of articles may be transported from the third zone into a fourth zone spaced from the third zone by at least one further microwave launcher (not shown) by moving the first group of articles along the convey line 240 in the forward direction. In this case, the first group of articles would pass by a third microwave launcher or pair of launchers (not shown) and would be exposed to even more microwave energy. Alternatively, if the second pair of launchers shown in FIG. 4 is the last pair of launchers in the microwave heating zone, the first group of articles may be withdrawn from the heating chamber 230 via its outlet by moving the group of articles along the convey line 240 in the forward direction, and may be sent for further heating in the holding zone (when present) or cooled in the quench zone as shown in FIGS. 1a and 1b.

Referring again to FIG. 4, when the second group of articles is in the second zone of the microwave heating chamber 230, a third group of articles may be loaded into the first zone, as shown in FIG. 4. In some cases, the third group of articles may be loaded into the first zone while the second group of articles is being transported from the first zone to the second zone and the first group of articles is transported from the second zone to the third zone, in a forward direction as described previously. Alternatively, the second and first groups of articles may be transported into the second and third zones, respectively, before the third group of articles is loaded into the first zone. Thereafter, the second and third groups of articles can proceed through the system in a similar manner as the first and second groups of articles described herein. Further groups of articles may be processed in a similar manner.

Although shown in FIG. 4 as including two pairs of oppositely-facing microwave launchers 224a and 224b and 224c and 224d, the above-described multi-pass heating method can be performed using a single microwave launcher. When the microwave heating system includes two or more microwave launchers, at least some of the launchers may be positioned on the same side of the microwave heating chamber. These same-side launchers may be axially spaced from one another along the length of the microwave heating chamber, in a direction parallel to the direction of travel of the carrier passing through the chamber. The microwave system may also include two or more same-side launchers that are laterally spaced from one another in a direction generally perpendicular to the direction of travel of the carriers through the chamber. In some embodiments, one of more same-side launchers may be disposed opposite from a reflective surface or only the vessel surface within the microwave heating chamber.

When the microwave heating system includes two or more same-side microwave launchers, the launchers may be spaced apart from one another along the direction of extension of the heating chamber or the convey line. In some cases, when the articles are loaded into a carrier, adjacent same-side microwave launchers may be spaced apart from one another by a distance that is at least about 50, at least about 55, at least about 60, at least about 65, at least about 70, at least about 75, at least about 80, at least about 85, at least about 90, at least about 95, at least about 100, at least about 105, at least about 110, or at least about 115 percent of the dimension of the carrier that is parallel to the convey line when the carrier is transporting the group of articles along the convey line.

Each microwave launcher may be configured to emit a particular amount of microwave energy into the microwave heating chamber. For example, each microwave launcher may be configured to emit at least about 5, at least about 7, at least about 10, at least about 15 kW and/or not more than about 50, not more than about 40, not more than about 30, not more than about 25, not more than about 20, or not more than about 17 kW. When the system includes two or more microwave launchers, each launcher may emit the same amount of energy as one or more other launchers, or at least one launcher may emit a different (e.g., lower or higher) amount of energy, as compared to at least one of the other launchers. In some cases, each group of articles passes by each microwave launcher at least 3, at least 5, at least 7, or even up to 9 times. As a result, the articles in each group is exposed to a higher "effective" number of launchers, as compared to the actual number of launchers within the system. This results in more effective and thorough heating of certain articles without the need for additional equipment.

Figure 5:
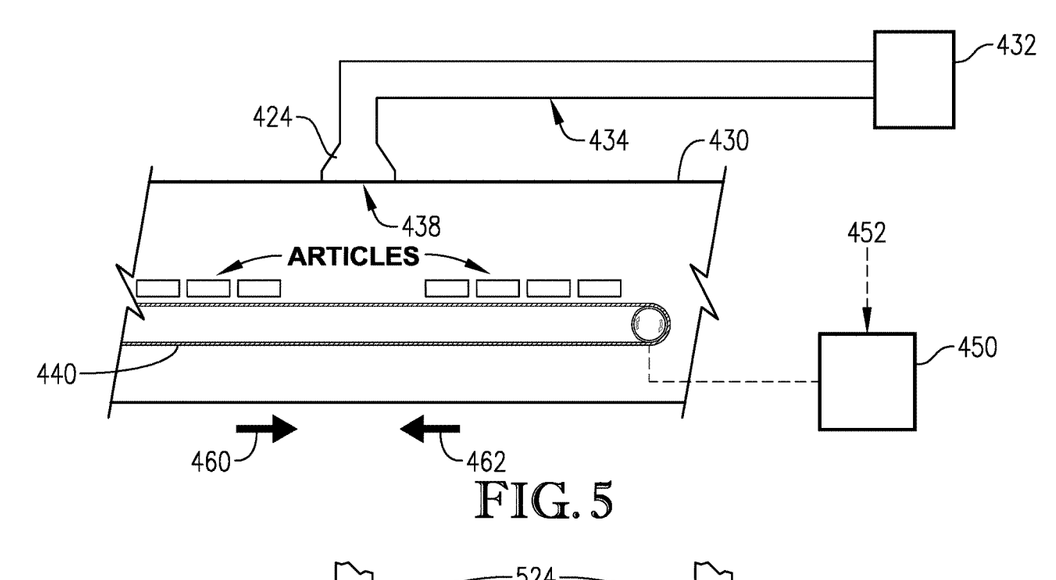
FIG. 5 is another schematic partial side cut-away view of a microwave heating chamber configured according to embodiments of the present invention, particularly illustrating one configuration suitable for multi-pass heating.

Another example of a microwave heating zone particularly useful for carrying out the above-discussed multi-pass heating method is illustrated in FIG. 5. As shown in FIG. 5, the system generally includes a microwave heating chamber 430 and a convey line 440 for transporting groups of articles through the heating chamber 430. The system in FIG. 5 also includes at least one microwave generator 432 for generating microwave energy and at least one microwave launcher 424 for discharging the microwave energy into the heating chamber 430. Additionally, the system shown in FIG. 5 includes a convey line control system 450 configured to move the articles in a first convey direction, shown by arrow 460, and a second, opposite convey direction, shown by arrow 462 in FIG. 5.

The convey line control system 450 permits groups of articles to move along the convey line and pass by the microwave launcher more than once and, in some cases, more than twice, as discussed in detail herein. The convey line control system 450 receives input from the user or another control system or source, shown as input 452 in FIG. 5, and controls the speed and timing of the convey line 440 in order to move groups of articles through the microwave heating chamber 430 as discussed in detail previously.

Figure 6:
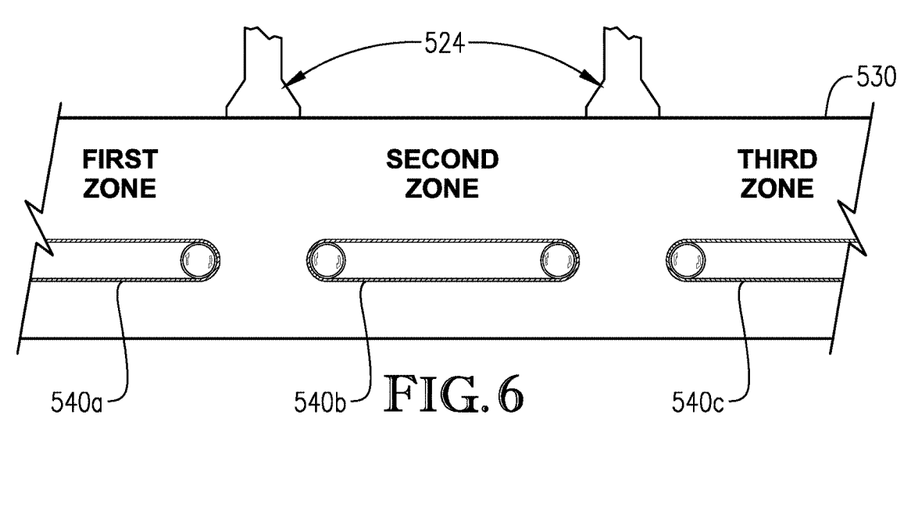
FIG. 6 is yet another schematic partial side cut-away view of a microwave heating chamber configured according to embodiments of the present invention, particularly illustrating a microwave heating zone with individual convey segments.

In some cases, as shown above in FIGS. 4 and 5, the microwave heating chamber can include a single convey line extending from the inlet to the outlet of the chamber. In other cases, as generally shown in FIG. 6, below, the microwave heating chamber can include two or more individual convey segments, shown as segments 540a, 540b, and 540c in FIG. 6, which are each disposed in one of the zones of the heating chamber, shown as "first," "second," and "third" zones of the heating chamber 530 in FIG. 6. When the microwave heating chamber 530 includes a single convey line, as shown, for example, in FIGS. 5 and 6, the movement of adjacent groups of articles may be performed simultaneously. However, when the microwave heating chamber includes one or more individual convey segments 540a-c, the speed and/or timing of the movement of various groups of articles may be different from one another.

Because the groups of articles are spaced apart from one another as they move along the convey line in the systems shown, for example, in FIGS. 4-6, there are periods during the heating process during which no load is present under the microwave launchers. Typically, this is undesirable as it can cause problems with how the microwave energy is distributed within the system. For example, when no load is present between a pair of opposite launchers, microwave energy discharged from one launcher enters the opening of the other launcher and can travel back through the distribution system toward the microwave generator. This disrupts the operation of the remainder of the microwave energy distribution system. For example, this type of reflected energy will cause microwave splitters, such as those used to divide microwave energy between two or more launchers, to malfunction. Therefore, gaps between articles in microwave heating systems have traditionally been avoided in the operation of conventional microwave heating systems.

It has unexpectedly been found that strategic placement of one or more multi-port circulators with dummy loads within the microwave distribution system avoids the above problems and permits spaced-apart groups of articles to be heated in the microwave chamber without disrupting the microwave energy distribution. Any suitable type of multi-port circulator may be used including, for example, a three-port circulator. Each microwave generator may have a circulator and dummy load to protect it from reflected energy. Each circulator/load pair absorbs reflected microwave energy to isolate the waveguide branch it is located on, while simulating an effective load so that the splitters and other system components continue to function even when the microwave launchers have no load.

Figure 7:
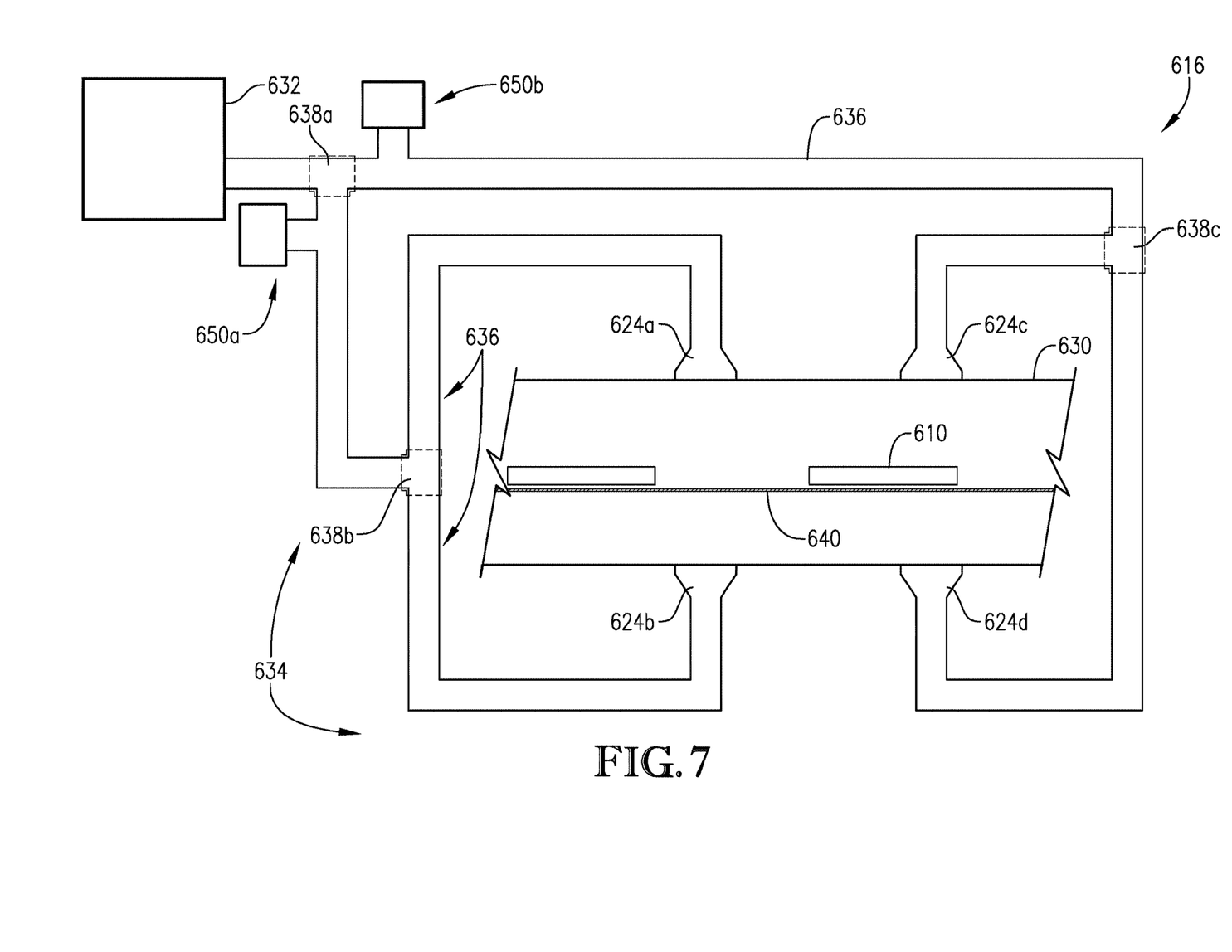
FIG. 7 is still another schematic partial side cut-away view of a microwave heating zone configured according to embodiments of the present invention, particularly illustrating the arrangement of a microwave heating chamber, a plurality of launchers, a microwave generator, as well as microwave splitters and circulator/load pairs.

One example of a microwave heating zone 616 including several circulator/load pairs is illustrated in FIG. 7. As shown in FIG. 7, the microwave heating zone 616 includes a microwave heating chamber 630 for heating groups of articles and a convey line 640 for transporting the articles through the chamber. The articles may be loaded in carriers 610, as shown in FIG. 7. The microwave heating zone 616 shown in FIG. 7 also includes at least one microwave generator 632 for generating microwave energy and a microwave distribution system 634 for directing the microwave energy from the generator 632 to the microwave heating chamber 630. Microwave heating zone 616 shown in FIG. 7 also includes at least two pairs of oppositely-facing microwave launchers (pair of launchers 624*a* and 624*b* and pair of launchers 624*c* and 624*d*), a plurality of waveguide branches 636, and at least three microwave splitters 638*a-c* for dividing the microwave energy into a plurality of microwave energy fractions that are ultimately discharged from each of the launchers 624*a-d*.

As shown in FIG. 7, the microwave heating zone 616 includes at least two circulator/load pairs 650*a* and 650*b* positioned near one of the microwave splitters 638*a* to absorb at least a portion of the energy reflected toward the generator 632. In some cases, at least about 35, at least about 40, at least about 45, at least about 50, at least about 55, at least about 60, at least about 65, at least about 70, at least about 75, at least about 80, at least about 85, or at least about 90 percent of the microwave energy discharged from one or more microwave launchers 624*a-d* may be reflected back into the system such as, for example, when the gaps between groups of articles (or carriers) pass under the microwave launchers 624*a-d*. In some cases, the circulator/load pairs 650*a* and 650*b* can absorb at least about 50, at least about 55, at least about 60, at least about 65, at least about 70, at least about 75, at least about 80, at least about 85, at least about 90, at least about 95, or at least about 97 percent of the total amount of energy reflected into the microwave distribution system 634 from the microwave heating chamber 630. The circulator/load pairs can include, for example, water loads.

Although any suitable number of circulator/load pairs 650 may be used, it has been discovered that placing circulator/load pairs 650 in particular locations minimizes the total number of circulator/load pairs 650 required to protect the system without impacting performance. More specifically, it has been discovered that locating circulator/load pairs 650 between sets of microwave splitters 638, as shown in FIG. 7, protects the generator 632 and maintains operation of the splitters 638, while minimizing the total number of circulator/load pairs 650 needed in the system. In some cases, the system can include not more than four, not more than three, or not more than two circulator/load pairs 650.

Turning back to FIGS. 1*a* and 1*b*, as the groups of articles pass through the microwave heating zone, the articles may be heated so that the coldest portion of each article achieves a target temperature. When the microwave heating system is a sterilization or pasteurization system, the target temperature can be a sterilization or pasteurization target temperature of at least about 65° C., at least about 70° C., at least about 75° C., at least about 80° C., at least about 85° C., at least about 90° C., at least about 95° C., at least about 100° C., at least about 105° C., at least about 110° C., at least about 115° C., at least about 120° C., at least about 121° C., at least about 122° C. and/or not more than about 130° C., not more than about 128° C., or not more than about 126° C.

When the microwave heating zone 116 includes a liquid-filled microwave heating chamber, the average bulk temperature of the liquid in the microwave heating chamber may vary and, in some cases, can depend on the amount of microwave energy discharged into the microwave heating chamber. The average bulk temperature of the liquid in the microwave heating chamber can be at least about 70° C., at least about 75° C., at least about 80° C., at least about 85° C., at least about 90° C., at least about 95° C., at least about 100° C., at least about 105° C., at least about 110° C., at least about 115° C., or at least about 120° C. and/or not more than about 135°, not more than about 132° C., not more than about 130° C., not more than about 127° C., or not more than about 125° C.

As the articles pass through the microwave heating zone 116, they may be heated to the target temperature in a relatively short period of time, which can help minimize any damage or thermal degradation of the articles. For example, the average residence time of each article passing through the microwave heating zone 116 can be at least about 5 seconds, at least about 20 seconds, at least about 60 seconds and/or not more than about 10 minutes, not more than about 8 minutes, not more than about 5 minutes, not more than about 3 minutes, not more than about 2 minutes, or not more than about 1 minute. The minimum temperature of the articles heated in the microwave heating zone 116 can increase by at least about 5° C., at least about 10° C., at least about 15° C., at least about 20° C., at least about 30° C., at least about 40° C., at least about 50° C., at least about 75° C. and/or not more than about 150° C., not more than about 125° C., or not more than about 100° C.

In some embodiments, the microwave heating zone (or heating chamber therein) can be operated at approximately ambient pressure. Alternatively, microwave heating zone 116 may include a pressurized microwave chamber that operates at a pressure that is at least 5 psig, at least about 10 psig, at least about 15 psig, or at least about 17 psig and/or not more than about 80 psig, not more than about 60 psig, not more than about 50 psig, or not more than about 40 psig above ambient pressure. As used herein, the term "ambient" pressure refers to the pressure exerted by the fluid in the microwave heating chamber without the influence of external pressurization devices.

As shown in FIGS. 1*a* and 1*b*, upon exiting the microwave heating zone 116, the articles may be passed to an optional holding zone 120, wherein the temperature of the articles can be maintained at or above a certain target temperature for a predetermined period of time. For example, in the holding zone 120, the temperature of the coldest part of the article can be held at a temperature at or above a predetermined minimum temperature of at least about 70° C., at least about 75° C., at least about 80° C., at least about 85° C., at least about 90° C., at least about 95° C., at least about 100° C., at least about 105° C., at least about 110° C., at least about 115° C., or at least about 120° C., at least about 121° C., at least about 122° C. and/or not more than about 130° C., not more than about 128° C., or not more than about 126° C., for a period of time (or "holding period") of at least about 1 minute, at least about 2 minutes, or at least about 4 minutes and/or not more than about 20 minutes, not more than about 16 minutes, or not more than about 10 minutes.

Once the heated articles, which may be sufficiently pasteurized or sterilized, exit the holding zone 120, when present, the articles may then be introduced into a quench zone 122, wherein they are cooled as rapidly as possible via submersion in a cooled fluid. The quench zone 122 may reduce the external surface temperature of the articles by at least about 30° C., at least about 40° C., at least about 50° C. and/or not more than about 100° C., not more than about 75° C., or not more than about 50° C. in a time period of at least about 1 minute, at least about 2 minutes, at least about 3 minutes and/or not more than about 10 minutes, not more than about 8 minutes, or not more than about 6 minutes. Any suitable fluid may be used in the quench zone 122 and, in some cases, the fluid may include a liquid similar to, or different than, the liquid used in the microwave heating zone 116 and/or the holding zone 120, if present. When removed from the quench zone 122, the cooled articles can have a temperature of at least about 20° C., at least about 25° C., at least about 30° C. and/or not more than about 70° C., not more than about 60° C., or not more than about 50° C. Once removed from the quench zone 122, the cooled, treated articles can then be removed from the microwave heating system for subsequent storage and/or use.

Microwave heating systems of the present invention can be commercial-scale heating systems capable of processing a large volume of articles in a relatively short time. In contrast to conventional retorts and other small-scale systems that utilize microwave energy to heat a plurality of articles, microwave heating systems as described herein can be configured to achieve an overall production rate of at least about 5 packages per minute, at least about 10 packages per minute, at least about 15 packages per minute per convey line, at least about 20 packages per minute per convey line, at least about 25 packages per minute per convey line, or at least about 30 packages per minute per convey line, measured as described in the '516 application. Alternatively, or in addition, the overall production rate can be not more than about 200, not more than about 150, not more than about 100, not more than about 75, not more than about 50, not more than about 35, or not more than about 30 packages per minute.

DEFINITIONS

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The preferred forms of the invention described above are to be used as illustration only, and should not be used in a limiting sense to interpret the scope of the present invention. Obvious modifications to the exemplary one embodiment, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A microwave heating system for heating articles, said microwave heating system comprising:
  a microwave heating chamber for heating said articles;
  at least one convey line for transporting said articles through said microwave heating chamber;
  a microwave distribution system comprising:
    a microwave generator for generating microwave energy;
    a first microwave launcher for directing at least a first portion of said microwave energy to said microwave heating chamber, wherein said first microwave launcher defines a first launch opening configured to discharge microwave energy toward said articles on said convey line;
    a second microwave launcher for directing at least a second portion of said microwave energy into said microwave heating chamber, wherein said second microwave launcher defines a second launch opening configured to discharge microwave energy toward said articles on said convey line;
    a first microwave splitter disposed between said microwave generator and said first launch opening; a second microwave splitter disposed between said microwave generator and said second launch opening; and
    a circulator and load pair positioned between said first microwave splitter and said second microwave splitter, wherein the circulator and load pair absorbs microwave energy reflected back into said microwave distribution system when a gap between said articles passes under at least one of said first launch opening and said second launch opening; and
  a convey line control system configured to move said articles in a first convey direction and a second convey direction opposite said first convey direction so that each of said articles is moved past said first launch opening more than once;
  wherein said first microwave splitter and said second microwave splitter are configured to divide microwave energy into a plurality of microwave energy portions for discharging from said first microwave launcher and said second microwave launcher;
  wherein said circulator and load pair is configured to protect the microwave generator and maintain operation of said first microwave splitter and said second microwave splitter.

2. The system of claim 1, wherein said convey line control system is configured so that each of said articles is moved passed said first launch opening more than twice.

3. The system of claim 1, wherein said microwave heating chamber comprises at least a first zone and a second zone, wherein said first microwave launcher is positioned between said first and second zones, wherein said convey line control system is configured to move a first group of articles along said convey line from said first zone to said second zone by moving said first group of articles past said first launch opening, and wherein said convey line control system is configured to move said first group of articles past said second launch opening more than once.

4. The system of claim 1, wherein said first and second microwave launchers are located on opposite sides of said microwave heating chamber.

5. The system of claim 1, wherein said first and second microwave launchers are located on the same side of said microwave heating chamber and are spaced apart from one another in a direction parallel to said first and second directions of convey.

6. The system of claim 1, wherein said convey line comprises a plurality of individual convey line segments spaced apart from one another in said microwave heating chamber.

* * * * *